US008751763B1

(12) United States Patent
Ramarao (10) Patent No.: US 8,751,763 B1
(45) Date of Patent: Jun. 10, 2014

(54) LOW-OVERHEAD DEDUPLICATION WITHIN A BLOCK-BASED DATA STORAGE (71) Applicant: Nimbus Data Systems, Inc., South San Francisco, CA (US)

(72) Inventor: Karempudi V. Ramarao, San Ramon, CA (US)

(73) Assignee: Nimbus Data Systems, Inc., South San Francisco, CA (US)

( * ) Notice: Subject to any disclaimer, the term of this patent is extended or adjusted under 35 U.S.C. 154(b) by 0 days.

(21) Appl. No.: 14/092,825

(22) Filed: Nov. 27, 2013

Related U.S. Application Data (60) Provisional application No. 61/778,432, filed on Mar. 13, 2013.

(51) Int. Cl.
G06F 12/00 (2006.01)
G06F 17/30 (2006.01)
(52) U.S. Cl.
CPC .............................. *G06F 17/30194* (2013.01)
USPC ........................................................ 711/162
(58) Field of Classification Search
CPC combination set(s) only.
See application file for complete search history.

(56) References Cited

U.S. PATENT DOCUMENTS

2012/0017060 A1* 1/2012 Kapanipathi et al. ......... 711/162
2013/0318051 A1* 11/2013 Kumar et al. ................. 707/692

OTHER PUBLICATIONS

Thwel, et al. "An Efficient Indexing Mechanism for Data Deduplication", © 2009 IEEE, p. 1-5.*

* cited by examiner

*Primary Examiner* — Brian Peugh
(74) *Attorney, Agent, or Firm* — Charles Shemwell (57) ABSTRACT

A write-data hash value corresponding to a block of write data is generated within a deduplicating data storage system. A block of lookup table entries is retrieved from a location in a lookup table stored within a block-based storage medium, the lookup table location being indicated by a first portion of the write-data hash value and each lookup table entry including a pointer to a respective stored data volume, a portion of a hash value that corresponds to the stored data volume, and a reference count indicating a quantity of references to the stored data volume. A second portion of the write-data hash value is compared to the portions of the hash values within the block of lookup table entries, and the reference count is incremented within one of the lookup table entries for which the portion of the hash value is determined to match the second portion of the write-data hash value.

21 Claims, 6 Drawing Sheets

FIG. 1

FIG. 7
Storage Server

FIG. 9
*Block Delete with De-Dup*

LOW-OVERHEAD DEDUPLICATION WITHIN A BLOCK-BASED DATA STORAGE

CROSS-REFERENCE TO RELATED APPLICATIONS

This application hereby claims priority to and incorporates by reference U.S. Provisional Application No. 61/778,432, filed Mar. 13, 2013 and entitled "Fast Access to High Bandwidth Deduplicated Data Storage."

TECHNICAL FIELD

The disclosure herein relates to data processing and more particularly to accessing deduplicated data storage.

BACKGROUND

The present disclosure generally relates to the storage and management of data blocks in a file system where duplicate blocks of data are not physically written to the storage media. Instead, the metadata structures of the file system maintain the appropriate information to be able to store, retrieve, update and delete data blocks as the users of the file system choose, guaranteeing a logical view of the file system as if duplicate blocks are also physically stored.

The operation of computer systems, and storage of data on non-volatile media such as hard disks and solid state memory are well-known in the art. Stored data is generally organized as files, with a hierarchical structure such as folders, which contain sub-folders, which in turn may contain sub-folders, and so on, and files. Folders are also equivalently referred to as directories in some operating systems.

The data in a file system can reside on a single storage medium, or multiple such media. It can also be localized to a single compute system, or spread across multiple storage media across multiple computer systems, or stored as a Network Attached Storage (NAS) or a Storage Area Network (SAN) that may be shared by a multitude of computers, both local and remote.

A file system maintains metadata about the directories, files, and the blocks within files. The general approach well-known in the art is that of iNodes. Each entity the file system manages, such as directories and files, has an iNode which acts as the root of a hierarchical metadata structure describing that entity. For example, the iNode of a file contains information about that file such as the owner of the file, the access permissions for that file, size of the file, as well as pointers to each of the blocks where the data for that file physically resides. Large files may require multiple levels of indirection to store the pointers to all blocks of the file.

In standard art, each block of a file is physically stored in a distinct location on the storage media. This is true even if several of these blocks are identical to each other. The process of deduplication attempts to identify if a new block being written to the storage has identical content with that of a block already stored and if so refrains from storing the new block. Instead, the pointer for the new block points to the old block to which it is identical. Thus, considerable volume of storage can be saved when large numbers of data blocks are identical to existing blocks.

An example scenario where deduplication is quite effective is in the context of Virtual Machine Disks (VMDK). Here, each virtual machine running on a computer has its own copies of operating systems, applications, data and other data structures. These are together stored in its VMDK. If 10 such virtual machines are running on a computer and they all use the same operating systems, then each of the 10 VMDK's has an identical copy of the operating system. It is clear that deduplication can save a substantial amount of storage in this scenario since exactly one copy of the operating system is sufficient to serve all 10 virtual machines, if properly managed and maintained.

There is a well-known method in the prior art, used to determine if two blocks have identical content, without having to make a bit by bit comparison between the two blocks. A cryptographic-strength hash function is applied to each of the blocks and the blocks are considered identical if their hashes are identical. Thus, when a new block of data arrives at the file system, it first computes the hash of that block. To be able to determine if this hash equals the hash of an existing block, the file system maintains a hash search tree with an entry for each of the existing blocks of interest. The file system then searches in the hash tree for the hash value of the new block. If that value is found in the search tree, then the new block is considered to have identical content to the existing block with the same hash value. If the new hash value is not found in the search tree, then the new hash is generally inserted into the search tree, together with a pointer to the location where the new block is written.

A side effect of deduplication is that when a block is removed, the corresponding physical block may not be removed immediately. This is because the same physical block may be pointed to by multiple logical blocks as a consequence of deduplication. A physical block can only be removed if all logical blocks pointing to that physical block are removed. This implies that a "reference count" be maintained for each physical block, which is incremented each time an incoming block matches that block, and is decremented each time a logical block pointing to that physical block is removed.

To process data blocks at very high rates, for example a million or more input/output operations per second, the hash search tree and other data structures must be searched very fast and efficiently. In addition, since deduplication is associated primarily with a write operation, the impact of deduplication on read operations should be negligible. Finally, the removal of a logical block should not cost significantly more than the write operation. The prior art suffers from a number of disadvantages in performing these operations in the context of deduplication. The present invention addresses this need for methods to perform efficient deduplication of file blocks while at the same time implementing the other operations at high efficiency.

BRIEF DESCRIPTION OF THE DRAWINGS

The disclosure herein is illustrated by way of example, and not by way of limitation, in the figures of the accompanying drawings and in which like reference numerals refer to similar elements and in which.

DETAILED DESCRIPTION

In various embodiments disclosed herein, a hash value generated in connection with a data block write operation is split by a deduplicating file system manager into prefix and suffix portions that are stored separately within an iNode and lookup table, respectively, applying the prefix as a partial address (or index) to the lookup table location in which the suffix is stored. Because only a single bifurcated instance of each hash value need be stored, duplicative storage of the hash value within the iNode and leaf node of a hash search tree is avoided, substantially reducing storage overhead required to implement deduplication data structures. Further, by storing hash suffixes within a lookup table that may be directly indexed by the hash prefix, the multiple input/output (I/O) operations typically required to search a hash tree structure (the tree structure itself obviated by provision of the suffix lookup table) may be reduced to a single I/O operation, thus reducing the number of I/O operations required for data block deduplication and instead raising the I/O per-second (IOPS) metric of the file system manager by freeing those I/O operations to be applied in client-requested I/O transactions. In other embodiments, the file system manager may be programmably configured to operate in one of multiple operating modes, including a performance mode that effects bifurcated hash storage (singular, bifurcated hash value storage, single I/O hash suffix retrieval) and a benchmark mode that carries out a hash tree search (multiple hash value storage, order of log N I/O operations to retrieve hash value from search tree). These and other features and characteristics of various embodiments are described below.

In a number of embodiments disclosed herein an input data file is decomposed into fixed-length data segments referred to herein as "data blocks." The fixed length is file system dependent and generally varies from 512 bytes to 128 kilo bytes, though block sizes above and below that range may apply. Additionally, while a number of embodiments described below relate to file systems or file system components working at the level of data blocks (i.e., "block-level file systems"), the various structures and methods disclosed in those embodiments are not limited to block level file systems, and thus may be more generally applied in "file-level file systems" or storage systems for other types of data structures.

Figure 1:
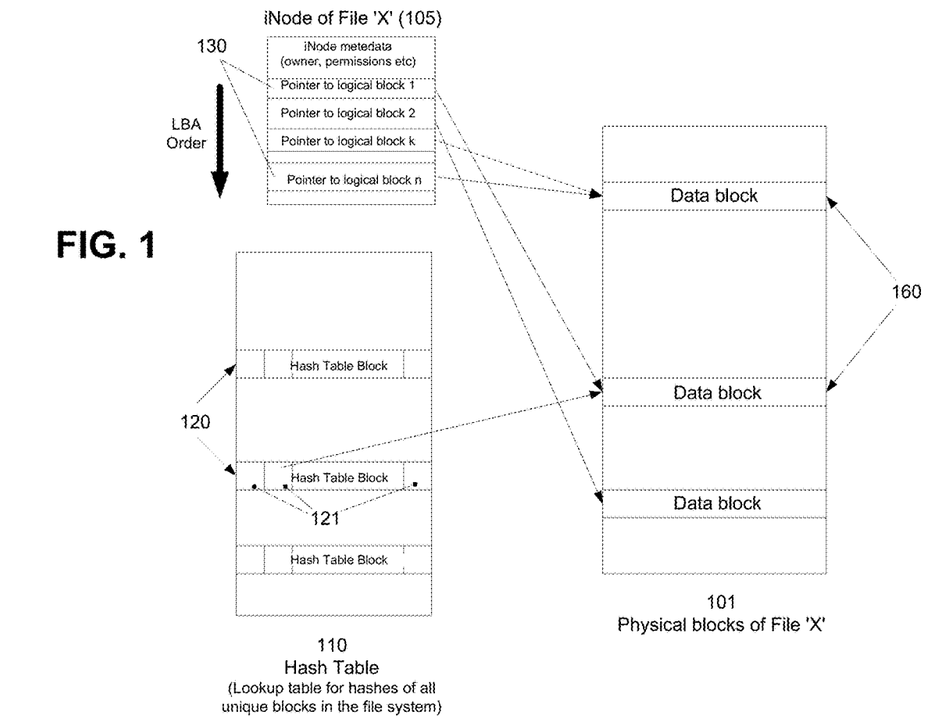
FIG. 1 is a block diagram illustrating an embodiment of the data structures for a deduplication method.

FIG. 1 illustrates an embodiment of a deduplication engine inserted into the write path of a file system. A file system without the deduplication function maintains two data structures directly related to the subject of the present invention. One is the iNode data structure 105 and the other is the data block data structure 101. Each directory and file in the file system has a corresponding iNode data structure 105. In the case of a file specifically, the iNode data structure 105 for that file generally contains at least two types of information. One is the global information about the file, or such as the owner of the file, the types of permissions granted to various users of the file, file size, when the file was last updated, and so on. Such information is collectively referred to as the "metadata" of the file and stored as the first part of the iNode structure for the file as shown (i.e., "iNode metadata"). A second part of the iNode structure of the file has pointers 130 to the data blocks 160 that belong to the file, in the order of a Logical Block Address (LBA) of the data blocks. Specifically, the first data block pointer 130 points to the physical data block 160 containing the first logical block of the file, the second data block pointer 130 points to the physical block 160 containing the second logical block of the file, and so on. This arrangement makes it easy to access a data block with a given LBA within a specified file "X" since the location within the iNode data structure for "X" where the pointer to that data block is available can be calculated by knowing the size of each such pointer. For example, if each pointer is of 8 bytes and LBA value of "201" is given, then the pointer for LBA "201" starts at a distance of 8*200=1600 bytes from the beginning of the pointer area within the iNode data structure and the 8 byte field starting there is the address of the data block with LBA "201".

The second data structure for a file "X" is data block storage 101, and contains the set of file data blocks themselves. Individual data blocks 160 are generally allocated dynamically as a file grows (and de-allocated as a file shrinks), either one block at one time or a group of contiguous blocks (referred to as an "extent") at one time. Thus data blocks 160 need not be in any particular order. For example, the address of the data block 160 corresponding to LBA "1" (i.e., "Pointer to logical block 1" within iNode data structure 105) need not have any specific relationship to the data block 160 corresponding to LBA "2" ("Pointer to logical block 2") and so on. The iNode data structure 105 manages the ordering of the blocks within a file according to the LBA numbers. This makes it possible to read/write data blocks of a file in the correct logical order (that is, in the order of the LBA's) even though physically they may be spread over one or more storage media in an arbitrary order.

Continuing the description of file operations in the absence of deduplication, writing a new block to a file at a given LBA number generally consists of the following steps: allocate a data block 160, write the data to the new data block 160, and place a pointer 130 in the iNode data structure at the appropriate LBA location pointing to the newly written data block. To read a block at a given LBA from a file, the location of the pointer within the iNode data structure for the given LBA is calculated as described in the example above, the pointer 130 at that location is taken and is used as the address of the data block, and that data block 160 is read.

In the embodiment of FIG. 1, an additional data structure is added to the file system to enable data block deduplication. Unlike the iNode data structure 105, the new data structure, Hash Table 110 of FIG. 1, does not necessarily have to be associated with a file, a directory, or any such part of the file system hierarchy. Depending on the scope of deduplication to be implemented, there can be either a single Hash table 110 for an entire file system, or one Hash table 110 for each of a part of the file system. For illustrative purposes only, a single Hash Table 110 is utilized for an entire file system within the embodiment of FIG. 1, though the approach employed with respect to the single hash table may be readily extended to multiple hash tables in alternative embodiments.

Hash table 110 of FIG. 1 does not have to be either fully or partially stored in the main memory of a computer system. It can fully be stored on a storage medium such as hard disk or solid state device. Such medium can physically be spread across multiple devices as well. Hash table 110 may optionally be stored in the form of one or more files and, in any case, just like a file, may be stored over a number of blocks of the storage media. Accordingly, in the embodiment of FIG. 1, Hash Table 110 is depicted as consisting of a number of blocks 120 of such storage media, each such block 120 designated "Hash Table Block" and containing a number of entries 125. Each such entry 125 has a pointer to a physical block that stores a data block and corresponds to a unique data block value. In other words, if two data blocks have identical content, then there is exactly one entry in the Hash table 110 corresponding to those two data blocks, exactly one instance of that data block is stored among the data blocks 160, and the pointer in the hash table entry 125 corresponding to that data block points to that instance of the data block.

In the embodiment of FIG. 1 and a number of embodiments disclosed below, Hash Table 110 is implemented as a block-level lookup table that is accessible with (i.e., addressed or indexed by) the high-order n bits of a hash value, referred to herein as a "hash prefix" (or "prefix" for brevity). For illustrative purposes only, consider a file system that has 100 TB (100 Terabytes) available for storing data blocks and assume that the file system uses a block size of 4 kB (four kilobytes) as the standard block size for storing data. This implies a total of 25 billion data blocks in the file system. In the worst case scenario, no two data blocks have identical content and thus the number of distinct data blocks is also 25 billion. Hash Table 110 has 25 billion entries 121 in this example scenario. Assume, for illustrative purposes only, that each entry in Hash Table 110 is of 32 bytes. Thus, a single block of 4 kB can contain 128 entries of the Hash table 110. Since Hash Table 110 is indexed on a partial hash value, there will be random hash collisions on that partial hash value even if there are no random hash collisions on the full hash value itself. For example, a 256-bit crypto-strength hash such as SHA-256 is believed to be collision-free in a file system with the total number of blocks less than or equal to $2^{128}$. In spite of this, if only the 32 high-order bits of the SHA-256 are used for indexing the Hash table 110, then there will be random collisions for any one specific such 32 bit partial hash when more than $2^{16}$ blocks are stored in the file system. Thus, there will be potentially several entries in Hash Table 110 for each partial hash value (hash prefix) of the chosen n bit size and n should be selected in such a way that all such entries can be stored in a known number of blocks. Continuing the above example for illustrative purposes only, if 32 bits of the hash value are applied as the n-bit hash prefix, then that gives 4 billion possibilities and potentially a choice of 8 entries per such hash prefix (i.e., 8 entries 121 per hash table block 120 indexed by a given hash prefix) will cover all potential unique data blocks, since the total number of entries that may be stored within hash table 110 is now 32 billion (i.e., 4 billion hash table blocks 120*8 entries 121 per hash table block), and thus more than the 25 billion data blocks in the file system. Since crypto-strength hash functions generally distribute the hash values uniformly for any random input space (including SHA-256, though any other practicable hash function may be used), such an arrangement should minimize the probability of not being able to accommodate the hash value of some data block in Hash Table 110.

As explained above, each entry 121 in Hash Table 110 has a pointer to the physical data block corresponding to the hash value stored in that entry. More specifically, in one embodiment, Hash Table 110 is applied as follows to find a physical data block with a given hash value, "H," having a total number of bits m:

apply the n high-order bits of "H" (i.e., the hash prefix) as an index (or address) into Hash Table 110, getting in return a hash table block 120;

search the retrieved hash table block 120, comparing the remaining m−n bits of "H" (i.e., the "hash suffix") with the partial hash value (i.e., stored suffix) within each of entries 121 in the retrieved hash table block 120;

if a matching hash suffix is found within an entry 121 of the retrieved hash table block 120, then the pointer in that matching entry points to the appropriate physical data block;

if no matching hash suffix is found within the retrieved hash table block 120, it can be inferred that a physical data block with the hash value "H" does not currently exist in the file system.

Figure 2:
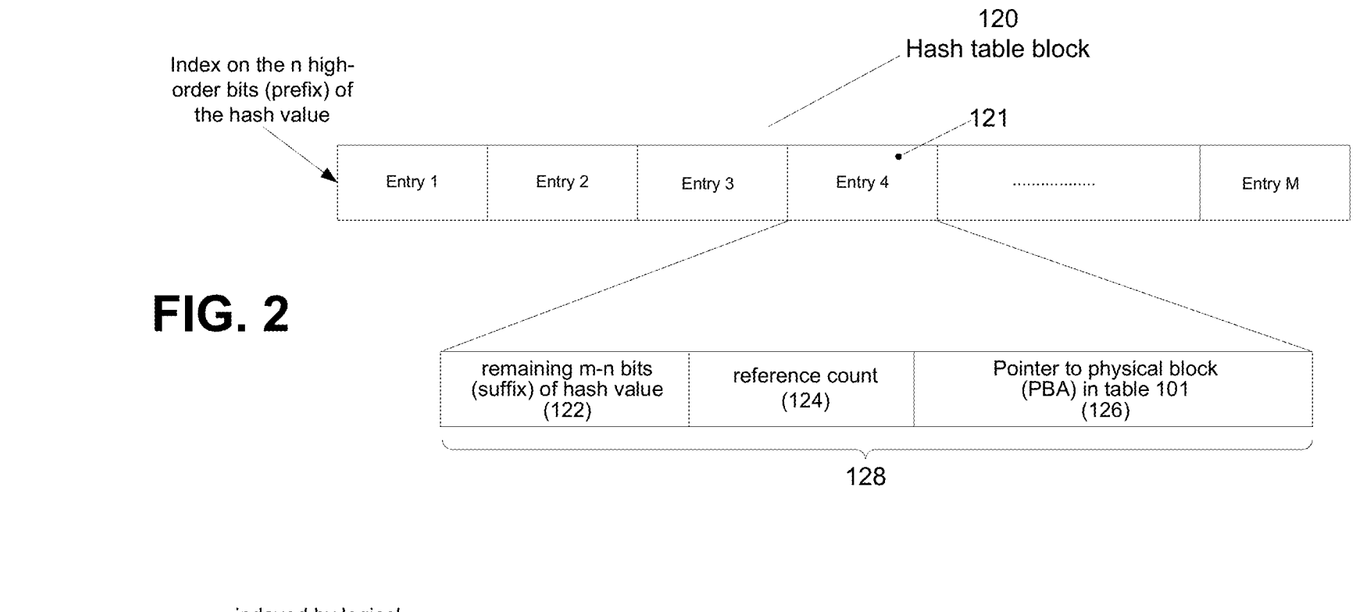
FIG. 2 is a block diagram illustrating an embodiment of a hash table block.

FIG. 2 illustrates an example of a Hash Table Block 120 that may be stored within Hash Table 110 of FIG. 1. As described above, hash table block 120 has multiple entries 121 and, in the particular implementation shown in detail 128, each entry 121 includes three fields: an m−n bit partial hash value (hash suffix) 122, a reference count 124, and a pointer to a physical data block 126. The m−n bit hash suffix 122, together with the n bit hash prefix (i.e., the index into the Hash Table 110), is identical to the full hash value. In other words, out of a full hash value "H", the high-order n bits are used for indexing into Hash Table 110 and the remaining (m−n) bits, where m is the length of the hash value "H", is the partial hash value 122. Note that, while such prefix/suffix bifurcation of the full hash value is carried forward in a number of embodiments described below, in all such cases the n-bits applied to index into Hash Table 110 may be alternatively acquired from the least-significant n bits of the m-bit hash value, or from a contiguous set of n-bits disposed anywhere between the least and most significant bits of the hash value, or from any scattered (not necessarily contiguous) set of n bits within the hash value.

Still referring to FIG. 2, reference count field 124 stores a count of the number of logical data blocks that have identical content with the hash value "H," and thus a "reference count." The reference count is set to 1 when a data block with a new hash value "H" (that is, a hash value "H" currently not in the Hash Table 110) is inserted into Hash Table 110, and incremented by 1 each time another logical block is added to the file system with the same hash value "H". Conversely, when a logical block with hash value "H" is removed, then the reference count within field 124 in the entry of Hash Table 110 with hash value "H" is decremented by 1. In this fashion, the reference count stored within reference count field 124 dynamically and accurately keeps track of the number of logical copies of a physical data block in a file system at all times. Finally, the third field of an entry 121 in hash table block 120 is a pointer 126 to a physical data block 160, also referred to herein as a physical block address (PBA). Now referring back to FIG. 1, it can be seen that a data block 160 has several pointers pointing to it: exactly one pointer from an entry in a hash table block 120 and multiple pointers from the iNode data structure 105. As discussed in further detail below, the path to a data block 160 going through the iNode data structure 105 is for read operations, while the path to a data block 160 going through the Hash Table 110 is for write operations and delete operations.

Figure 3:
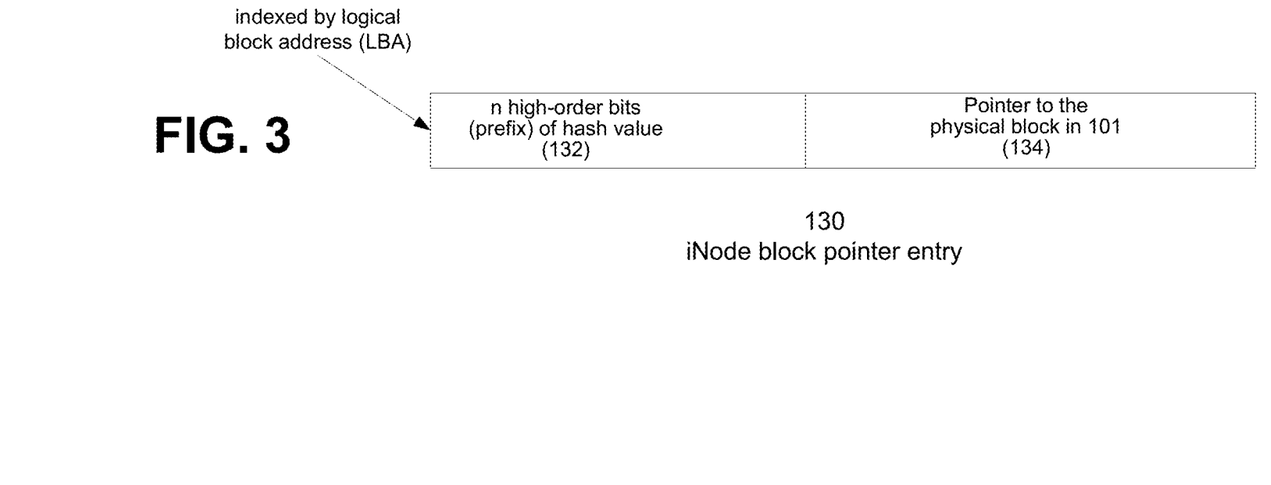
FIG. 3 is a block diagram illustrating an embodiment of an iNode block pointer entry.

FIG. 3 illustrates an exemplary format of an iNode data block pointer 130. It may be recalled that the iNode data structure 105 has two areas in it, the first area containing metadata about the directory or file structure that a structure 105 represents, and the second area containing the pointer information to data blocks 160. FIG. 3 exemplifies one entry within this second area of an iNode 105. In a number of embodiments, each iNode block pointer 130 corresponds to exactly one logical block of the directory or file that an iNode data structure 105 represents. In other words, there are as many such iNode block pointers 130 in iNode 105 as there are logical blocks in the corresponding directory or file at a given time.

Still referring to FIG. 3, the exemplary iNode block pointer 130 consists of two fields: a partial hash value field 132 or "hash prefix field," and a field 134 to store a pointer to a physical data block. In the embodiment shown, the hash prefix field stores the high-order n bits of the hash value (i.e., the hash prefix) of the logical block represented by the subject iNode block pointer 130 and thus the n-bit hash prefix used to index the Hash Table 110 of FIG. 1. The partial hash value field 132 can thus be viewed as containing a pointer to a specific Hash Table block 120 of the Hash Table 110.

The data block pointer field 134 of an iNode block pointer 130 stores a pointer to the data block 160 that stores the content of the logical block represented by that entry 130, and thus a physical block address (PBA). Accordingly, the two fields in the exemplary iNode block pointer 130 of FIG. 3 are pointers, one pointing to the Hash table 110 and the other pointing to the data block tables 101 (note that there may be several data block tables 101, for example, one for each structure in the file system, including directories and files). As explained below, hash table block pointer 132 is used when a logical block is to be removed from a file, enabling navigation from the iNode data structure 105 of that file to a specific hash table block 120 within Hash Table 110 so that the reference count field (e.g., field 124 in FIG. 2) within an entry 121 of that hash table block can be decremented. The physical block address within pointer field 134 is used when reading a logical data block, to navigate from the iNode data structure 105 of that file to the corresponding physical data block 160 within data block table 101.

Figure 4:
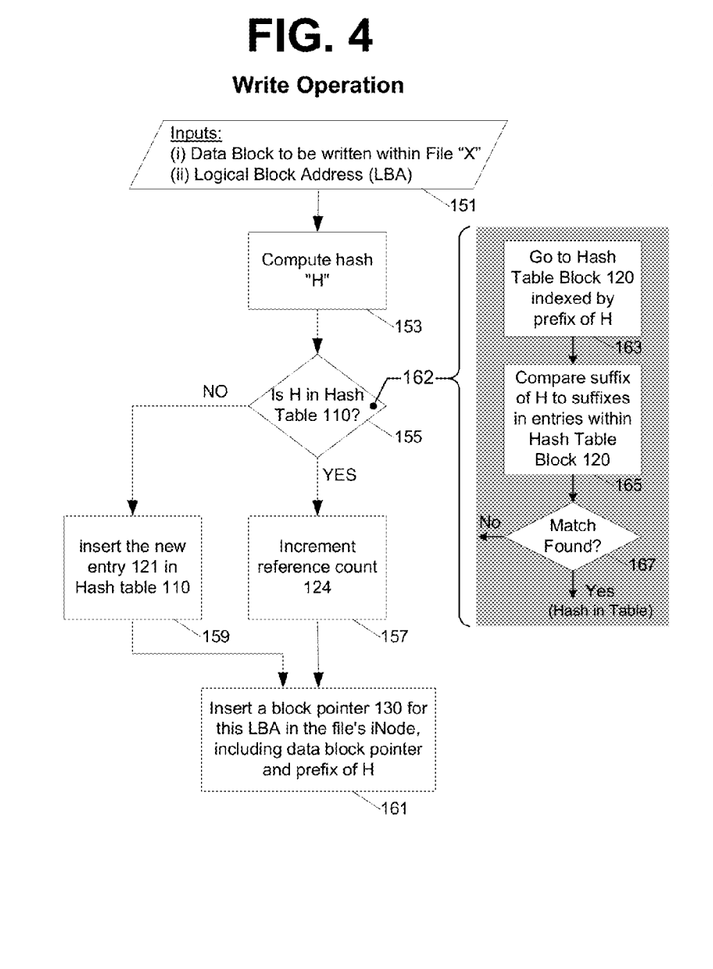
FIG. 4 is a flow diagram illustrating an exemplary deduplication of a data block being written.

FIG. 4 is a flow diagram of an exemplary block write operation that may be executed by a file system manager with respect to a file "X" in the file system described in reference to FIGS. 1-3. In embodiment shown, two parameters form the block write input: a Logical Block Address (LBA), and the content of the data block to be written (the "write data block") as shown at 151. In the presence of deduplication, an exemplary first step in processing the write operation is to compute the hash value "H" of the write data block at 153. As mentioned earlier, the hash computation operation at 153 may be accomplished by invoking (or executing) a crypto-strength hash function that outputs a chosen number of bits (m) in length, as it relates to the total potential number of blocks in the file system. In an exemplary fashion, if the address space of a file system is of 64 bits (which corresponds to a maximum of $2^{64}$ blocks), it is sufficient that the crypto-strength hash function outputs a 128 bit hash value (m=128) to ensure that the probability of random hash collisions is negligibly small when up to $2^{64}$ blocks are present in the file system.

At operation 155 of FIG. 4, the file system manager determines whether the computed hash value (H) is resident within Hash Table 110. In one embodiment, shown in detail view 162, the determination at 155 is effected by indexing Hash Table 110 using the high-order n bits of "H" to obtain a hash table block 120 (i.e., table lookup operation 163 using prefix of H). The entries in the hash table block 120 are searched for a match for the remaining (m–n) bits 122 of the hash value "H" at operation 165 (comparing suffix of H with suffixes within indexed hash table block 120). If a match is found, then hash value H is deemed to be "present" in Hash Table (i.e., by virtue of the H-suffix presence within a storage block addressed by H-prefix) thus yielding an affirmative determination at 155 (a Hash Table "hit"). If no match is found, then a Hash Table "miss" has occurred, yielding a negative determination at 155. If H is determined to be present in the Hash table, then the corresponding reference count 124 is incremented by 1 in operation 157. After incrementing the reference count, operation 161 is executed to insert a pointer 130 into the iNode for file "X" at a location computed from the logical block address (LBA). In the example shown, the pointer 130 is populated with the hash prefix (the high-order n bits of hash value H in this example) and a data block pointer that points to the physical data block (i.e., fields 132 and 134 of FIG. 3), the latter being copied from the suffix-matching hash table entry. This operation completes the insertion of a new entry 130 into the iNode for file "X" and thus a deduplicated block write operation, where a hash table hit occurs.

When no match is found in the Hash Table 110 for the hash value "H" (i.e., negative determination at 155 and thus at 167), a new entry 121 is inserted into the hash table block 120 indexed by the prefix of H as shown at 159. More specifically, the suffix of H (i.e., remaining m–n bits of H) is written to the suffix field within the new hash table entry (i.e., suffix field 122 in FIG. 2) and the reference count field is set to 1 to reflect the new entry. Further, the address of a newly allocated data block 160 is obtained from the file system (e.g., from a logical volume manager or other downstream control logic) and written into the physical block pointer field of the new hash table entry (i.e., PBA field 126 in FIG. 2).

Following the new hash table entry insertion at 159, a new pointer entry 130 is inserted into the iNode data structure 105 of file "X" at the logical block address (i.e., a location computed from the input logical block address) as shown at 161. More specifically, the prefix of H is written into the prefix field (field 132 in FIG. 3) and the physical block pointer written into the new hash table entry in operation 159 is also written into the PBA field of the new pointer 130 (i.e., in field 134 as shown in FIG. 3). The operation at 161 completes the insertion of a new pointer entry 130 within the iNode of file "X" and thus the block write operation.

Figure 5:
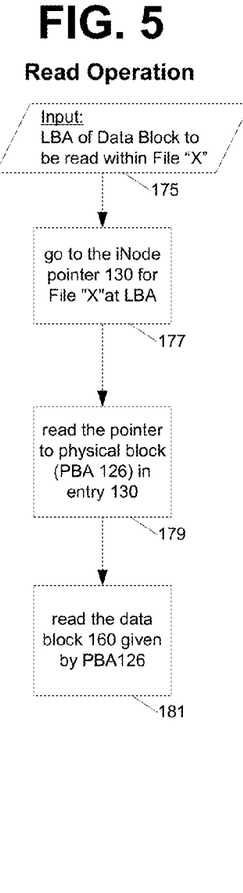
FIG. 5 is a flow diagram illustrating an exemplary read operation of a data block in a deduplicating file system.

FIG. 5 is a flow diagram of an exemplary block read operation from a file "X" in the file system. As shown at 175, the logical block address (LBA) of the block to be read forms the single input parameter in the read operation. In general, the block read operation is executed in a minimally-intrusive manner that requires no access to the deduplication hash table or deduplication-specific data within the iNode for the block to be read. In the flow diagram shown, for example, the input LBA is used first at 177 to address (or compute the location of) the iNode block pointer entry 130 of FIG. 3 of the given file's iNode data structure 105. The physical block pointer or PBA within the indexed iNode entry 130—field 126 in the exemplary iNode entry of FIG. 2—constitutes the address of the data block to be read. Accordingly the PBA is retrieved from the indexed iNode entry at 179 and applied at 181 to read the data block.

Figure 6:
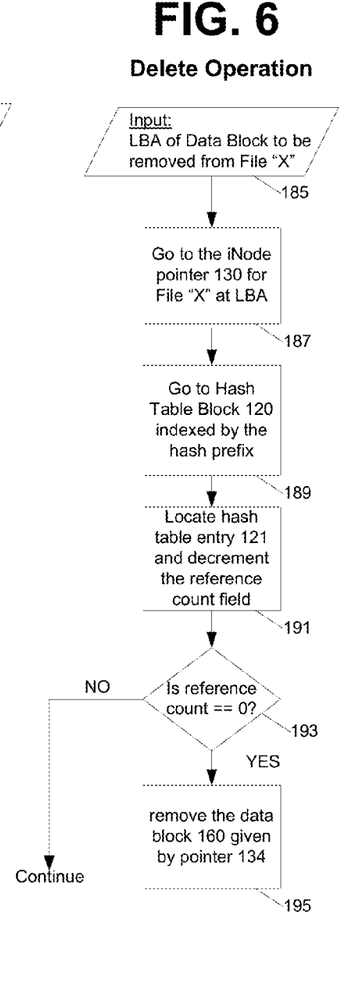
FIG. 6 is a flow diagram of an exemplary block removal operation in a deduplicating file system.

FIG. 6 is a flow diagram of an exemplary block removal (or delete) operation from a file "X" in the file system. As in the block read example shown in FIG. 5, the logical block address (LBA) forms the single input in the block delete operation as shown at 185. At 187, the iNode data structure 105 for file "X" is accessed to retrieve pointer entry 130 from the location indicated by the LBA. At 189, the hash prefix within pointer entry 130 is applied to index the hash table and thus retrieve a hash table block (e.g., hash table block 120 as shown in FIG. 1). Though not specifically shown, the physical block pointer within pointer entry 130 may be copied to a temporary location and then nulled within the block pointer field within the pointer entry, effectively clearing the iNode pointer entry 130. At 191, the hash table block 120 is searched for a PBA (physical block pointer) that matches the PBA within or copied from iNode pointer entry 130. When a hash table entry containing a matching PBA is found, the reference count is decremented to reflect the delete operation and written back to the subject hash table entry. If the decremented reference count is zero (indicating that no further references to the physical block remain), the physical block is removed (or otherwise deleted, invalidated or marked for deletion or invalidation) at 195. If the reference count is not zero, then at least one reference to the physical data block remains, so that the delete operation concludes without removing the physical data block. Note that writing a zero-valued reference count back to the PBA-matched hash table entry may, at least in one embodiment, serve to indicate an unused hash table entry (i.e., invalidate or null the hash table entry so that it may be re-used in subsequent block write operations).

To contrast this scenario with one where there is no deduplication, it can be seen that when there is no deduplication, one block access is made to the iNode data structure 105 to find the entry 130 for the given LBA 150 and then one access is made to another file system data structure (not shown in any of the figures here) to indicate that the data block 160 pointed to by the PBA is no longer in use and is free. With deduplication, the same one access is made to 105, but a second access is made to the Hash Table 110. Two possibilities arise now: either the reference count, after being decremented, becomes zero or it remains non-zero. If the reference count remains non-zero then no further data structure accesses are necessary. Only when it becomes zero is another access needed to indicate that the data block 160 is no longer in use, just as in the case when there is no deduplication. In other words, the impact of deduplication is one additional data structure access when the reference count 124 becomes zero. The probability of this event is directly related to the amount of deduplication found in the file system. For example, if 50% of the blocks are deduplicated, that is, only half of the data blocks are physically stored, then the average reference count is 2 and thus the probability that reference count becomes zero after a decrement is 1/2. In this scenario, the average number of additional data structure accesses due to deduplication is 1/2. If the deduplication ratio is higher, then the average number of additional data structure accesses due to deduplication is lower. For example, if the deduplication ratio is 5× (i.e., only $1/5^{th}$ of the logical data blocks are physically stored), then the average number of additional data structure accesses due to deduplication is 1/5.

Although nonvolatile memory is generally assumed for storage of the data structures described herein (which may be or include the same nonvolatile memory used to store physical data blocks), main memory (e.g., volatile operating memory, such as DRAM or SRAM) may be used to store, process, or maintain any or all of the data structures in particular embodiments.

With the number of compute cores per processor growing rapidly, the input/output bandwidth allowed by a storage system is the bottleneck resource in determining the overall throughput of a deduplicating file system. At the same time, newer technologies such as solid state devices are steadily raising the input/output bandwidth to many gigabytes per second. It is thus critical that a deduplication engine does not waste any of this precious resource by increasing the number of accesses to the various data structures necessitated by deduplication. The techniques and structures above demonstrate that, by adding just a single data structure and which is accessed only for block write and block remove operations and not for read operations, it becomes possible to reduce the number of input/output operations with respect to a deduplicated solid state storage (or any other nonvolatile storage) and thus increase TOPS available for data access operations and reduce operational latency. Even when the added data structure is accessed, no more than one access on average is required under the embodiments described above.

Figure 7:
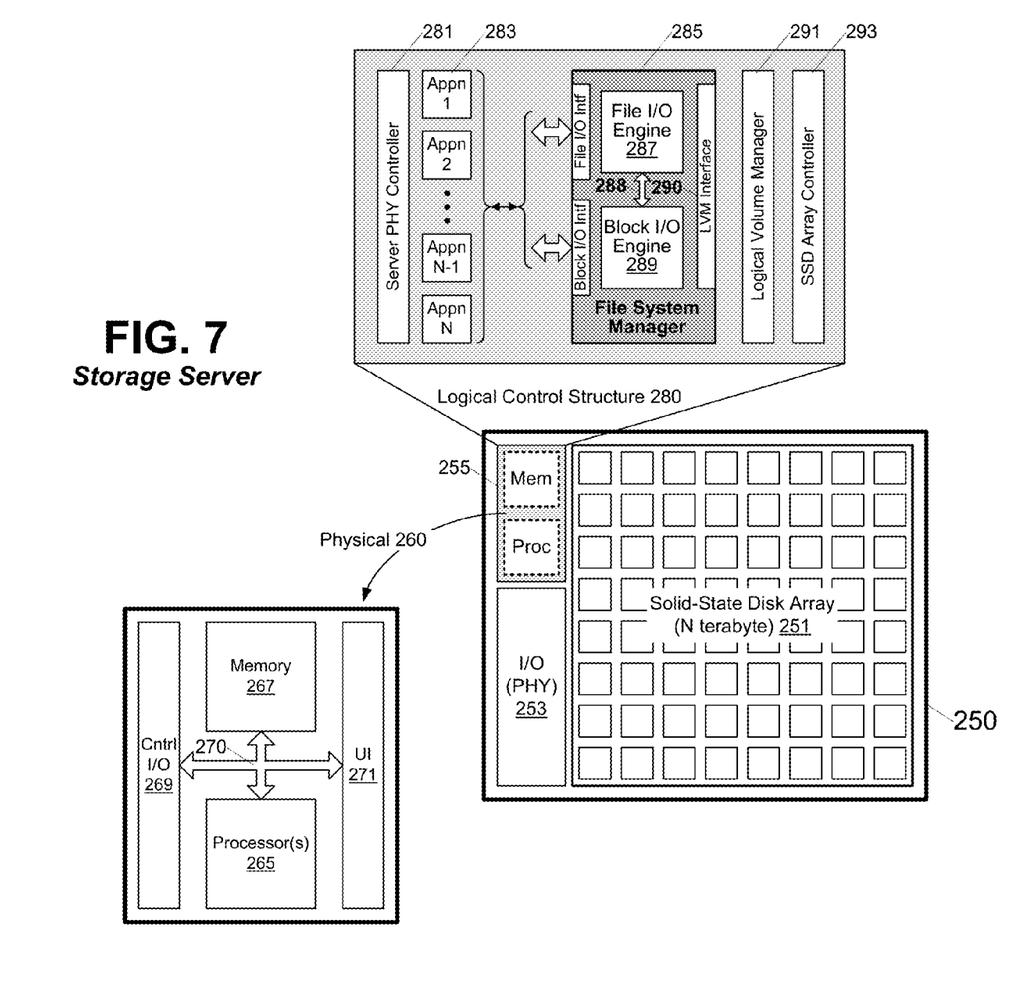
FIG. 7 illustrates an embodiment of a storage server capable of executing the low-latency, reduced-I/O-count deduplication operations described in reference to FIGS. 1-6.

FIG. 7 illustrates an embodiment of a storage server 250 capable of executing the low-latency, reduced-I/O-count deduplication operations described above. While generally applicable in numerous environments, storage server 250 is assumed for purposes of example to operate within a network that serves a significant number of users, such as the Internet, private intranet or other large network or interconnection of networks. More specifically, in the embodiment shown, storage server 250 is assumed to host multiple virtual machines (VMs) each of which may be accessed by network clients in connection with network-enabled tasks, sometimes referred to as "cloud services." Such virtual machines are generally perceived and referred to by such network clients by the names of the applications they enable (e.g., various database applications, office-based applications, or any other useful executable process) and generally include operating system code that may be executed to support such applications, as well as the application code instances themselves. In many cases, a single virtual machine may serve multiple clients, while another virtual machine hosting the same application (e.g., a word processor or database application) may serve another set of clients or even an overlapping set of clients. In such scenarios, each virtual machine instance may execute the same application code, a redundancy perfectly suited for deduplicated storage. Moreover, even where virtual machines host different applications, such "VMs" may execute identical operating system code, again inviting improved storage efficiency through deduplication.

Still referring to FIG. 7, storage server 250 includes, as primary or conceptual components, a storage array 251, physical input/output (I/O) or "PHY" 253, and controller 255. In the embodiment shown, storage array 251 is assumed to include a block-based array of solid-state disks (SSDs) collectively capable of storing, in block form, many terabytes of data (i.e., a mass nonvolatile storage), though any other type of nonvolatile storage may be used and/or the scale of the storage may be larger or smaller than the N-terabyte storage shown. Also, physical blocks of data stored in SSD array 251 may be smaller or larger than logical blocks of data operated upon by other functional blocks of storage server 250. PHY 253 receives and transmits information in connection with service requests from network clients, including data to be stored within/retrieved from solid-state disk array 251 and various commands in connection with such data, including, without limitation, file read/write/modify/delete commands, and thus various block-primitive operations (e.g., read/write/remove) as discussed above. As its name implies, controller 255 controls operations within storage server 250 with respect to PHY 253 and solid-state disk array 251 as necessary to serve incoming client requests and initiate scheduled transactions. Controller 255 is shown in physical view 260 as including one or more processors 265, memory 267, control I/O interface 269 and user-interface 272 (the latter being used, for example, to enable user/administrator configuration and maintenance of storage server 250) interconnected via one or more signaling structures 270, though numerous additional or alternative components may constitute controller 255 with all such components interconnected in virtually any practicable architecture. The one or more processors 265 (each of which may be implemented within an integrated circuit or packaged set of integrated circuits containing multiple processing cores) may include processors of any type, including general-purpose processors, special-purpose processors (e.g., security co-processors, arithmetic co-processors, digital signal processors, etc.) and/or application specific integrated circuits (ASICs). Similarly, memory 267 may include numerous distinct or integrated types of memory, including one or more dynamic random access memories (DRAMs), static random access memories (SRAM), register files, nonvolatile storage and so forth. Further, while not specifically shown, nonvolatile memory required by controller 255 may be provided or supplemented by an allocation within solid state disk array 251 so that memory 267 should be understood to include, at least in some embodiments, storage within solid state disk array 251. This may particularly be the case with respect to the file system management and deduplication data structures described above.

Still referring to the embodiment of FIG. 7, program code execution within the one or more processors of controller 255, together with the PHY 253 and, in some embodiments, control circuitry resident within solid-state disk array 251 (e.g., one or more flash memory controllers), instantiates the exemplary logical storage-server control structure shown at 280. In the implementation shown, logical control structure 280 includes a server PHY controller 281, some number (N) of application processes 283 (each of which may be executed within its own virtual machine), a file system manager 285, a logical volume manager 291 and an SSD array controller 293. In general, incoming client requests are initially processed by the server PHY controller (managing reception of the requests via PHY 253) and then routed to the appropriate application instances 283 (i.e., applications 1 through N). In cases where an incoming client request triggers a file read, write (including file-modify) or delete operation, the subject application 283 forwards corresponding file and/or data block transaction requests to file system manager 285 via a file I/O interface and/or block I/O interface, respectively ("File I/O Intf" and "Block I/O Intf"). In the embodiment shown, file system manager 285 includes separate file I/O and block I/O engines 287, 289 for executing the requested file I/O operations and block I/O operations, with file I/O operations generally being decomposed into block I/O operations and supplied to block I/O engine 289 via engine-to-engine interface 288. In one implementation, block I/O operations executed by block I/O engine 289 are carried out with respect to logical blocks which may be the same size as physical blocks within the SSD array, though each logical block may alternatively encompass multiple such physical blocks or constitute a fractional portion of a given physical block. In the embodiment shown, block I/O engine 289 is capable of executing various block I/O operations (e.g., block write, block read, block delete) applying the deduplication techniques and structures described above in reference to FIGS. 1-6. In other embodiments, including those described below in reference to FIGS. 8 and 9, block I/O engine 289 and thus file system manager 285 may be programmably configured (e.g., during an initial or post-installation configuration of storage server 251) to operate in one of at least two deduplication modes, including a "performance" mode that leverages bifurcated storage of block hash values (e.g., prefix within iNode, suffix within hash lookup table as described above), as well as a "benchmark" mode in which separate complete instances of block hash values are stored within iNode and hash search tree structures. These two operating modes are contrasted in greater detail below.

Continuing with file system manager 285, outputs from file I/O engine 287 and block I/O engine 289 are provided, via interface 290, to a logical volume manager 291 which, in turn, supplies commands and data to solid-state disk array controller 293 for application to the solid-state disk array. Data or control/status information returned from the solid-state disk array flows in the reverse direction through the SSD array controller, logical volume manager, file system manager, and so forth, in general being manipulated as necessary to meet the logical view of the upstream and downstream interface perceived by each logical component.

Reflecting on the logical control structure shown in FIG. 7, numerous other components may be provided in addition or as alternatives to those shown. More generally, while the various deduplicated data storage techniques and structures disclosed herein may be implemented within the specific logical and physical control structures of FIG. 7 (and more generally within the conceptual view of storage server 250), such techniques and structures may also be implemented within altogether different control structures and device or appliance architectures, including devices, appliances or computing systems that carry out functions other than those described in connection with storage server 250.

Figure 8:
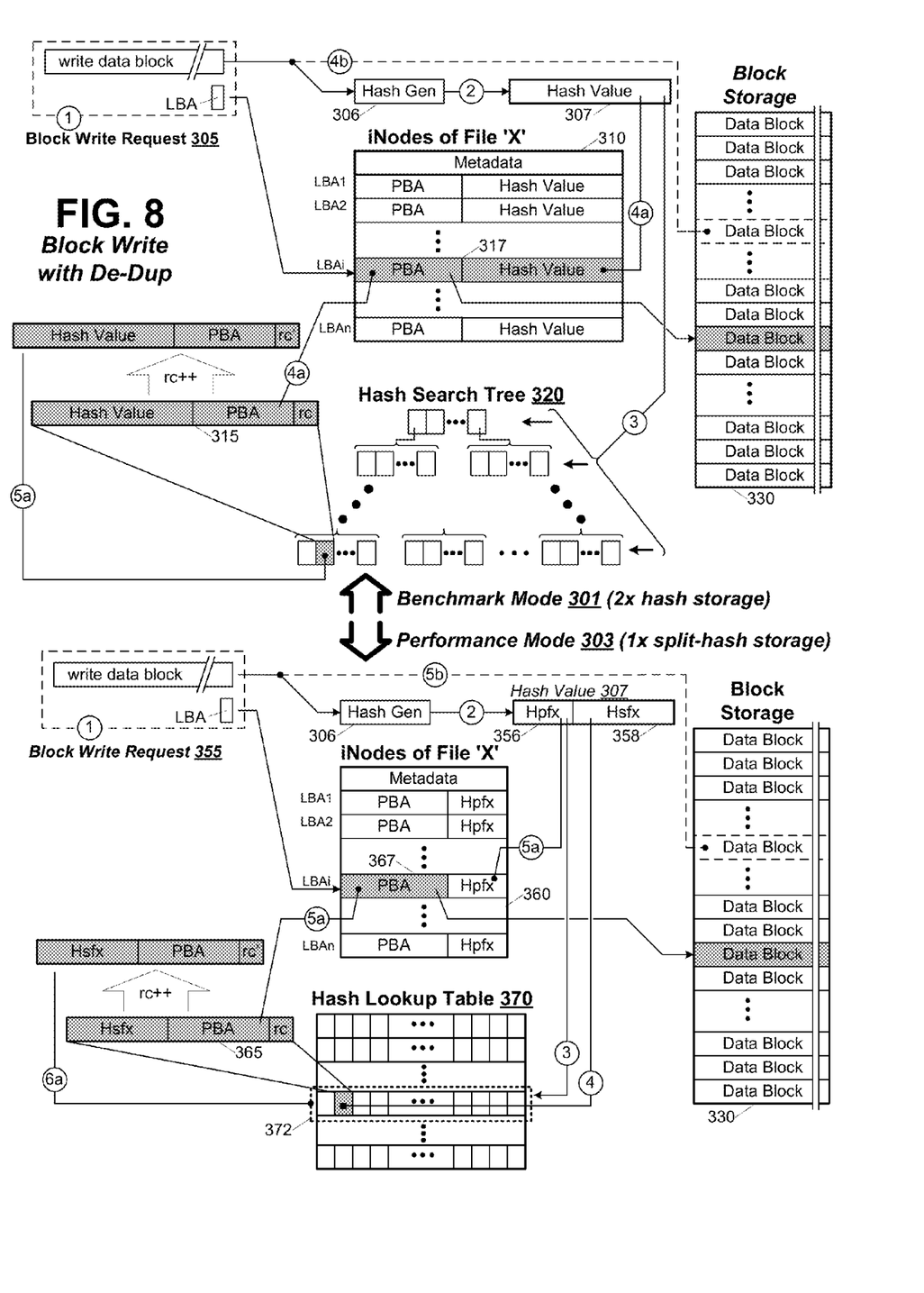
FIG. 8 contrasts deduplicated block write operations in benchmark and performance operating modes within a multi-mode file system manager.

FIG. 8 contrasts deduplicated block write operations in benchmark and performance operating modes within a multi-mode file system manager. Referring first to benchmark mode 301 (upper half of FIG. 8), the file system manager receives a block write request at 305 as shown at (1), including a write data block and logical block address (LBA). The write data block is hashed within hash generator 306 (e.g., a dedicated hash logic circuit or logic instantiated through software execution) to yield a hash value 307 as shown at (2). The computed (or generated) hash value is then applied in a search (3) of hash search tree 320, an operation that generally involves a storage I/O operation at each hierarchical level of the search tree, and thus approximately log N I/O operations, where N is the total number of hash entries within the search tree. If a matching hash value is found in the search tree (i.e., a search tree entry contains a hash value that matches the hash value computed for the write data block), then the write data block is assumed to be present within block storage table 330 at the location pointed to by the physical block address (PBA) within the located search tree entry. Accordingly, as shown at operation (4a), the PBA from the hash-matched search tree entry 315 is copied into the PBA field of a pointer entry 317 within iNode 310 of file "X" (i.e., the pointer entry indexed by the LBA provided in the block write request) as is the hash value corresponding to the data block at that PBA (which may be a copy of the computed hash value 307 or the search-tree-stored hash value, as those entities are identical). Thereafter, the reference count for the PBA is incremented (indicated by the operation "rc++" which yields an updated reference count, rc') and the encompassing search tree entry (now updated to reflect the incremented reference count) is written back to search tree 320 in update operation (5a). If no matching hash value is located within search tree 320 in the search operation at (3), then the write data block is written to the block storage table 330 at operation (4b) to effect a non-deduplicated write operation. Though not specifically shown, the write operation at (4b) is accompanied by an update to search tree 320 to store a new leaf node containing the PBA of the newly written data block, the hash value for the data block and a unity-valued reference count (rc=1). The search tree update itself will generally require multiple I/O operations to locate the correct leaf node location in which to insert the new search tree entry.

Reflecting on the block write operations and data structures employed in benchmark mode, it can be seen that two complete copies of the hash value are stored for each data block within table 330: one copy in the iNode data structure (in pointer entry 317) and the other copy in the hash search tree structure (within search tree entry 315). As a separate hash value is generated for each of possibly billions of data blocks (or more) and the hash value tends to be appreciable in size (e.g., 256 bits in the case of many crypto-strength hash functions), this double-storage of hash values imposes a significant storage overhead in return for the deduplication benefit. Of possibly greater concern in many cases is the number of I/O operations required to search the hash tree—on the order of log N as discussed above. In embodiments in which the hash search tree is stored within the same nonvolatile memory as the write data blocks (e.g., the SSD array shown in FIG. 7), such I/O operations not only add latency to each block write operation, but consume precious I/O cycles that could otherwise be allocated to user-requested data access, thus lowering the a key metric (IOPS) of the host system.

Turning to the performance mode operation shown at 303 (lower half of FIG. 8), a write data block and LBA are supplied in connection with a block write request 355 as before (i.e., as shown at (1), and the write data block is similarly hashed within a hash generator 306 to yield hash value 307. Instead of applying the entire hash value in a search tree search, however, the hash prefix ("Hpfx" which may be the high-order n bits of the hash value, or any other group of n bits within the hash value) is applied as shown at (3) to address a hash lookup table 370 (i.e., a hash table as described in reference to FIG. 1), thereby retrieving a hash table block 372 containing some number of hash table entries. Having retrieved the relevant hash table block, the hash suffix for the incoming write data block ("Hsfx"—all bits of hash value 307 not used to constitute the hash prefix) is compared with hash suffixes in the entries of the retrieved hash table block as shown at (4). If a suffix match is found, then an instance of the corresponding write data block is presumed to be present in block storage table 330 in view of the matching hash suffix within an entry of the hash table block corresponding to the address of the prefix. That is, a complete hash value match is, in effect, confirmed by the suffix match determination at (4) and prefix indexing operation at (3). Accordingly, at (5*a*) the PBA within matched hash table entry 365 is recorded within the LBA-indexed pointer entry 367 within iNode data structure 360 and the hash prefix is also stored within the iNode pointer entry. As discussed below, such hash prefix storage is sufficient enable location of the corresponding hash table entry in the case of a subsequent block delete operation, as the PBA recorded with the hash prefix can be used to identify the specific hash table entry within the prefix-indexed block. To conclude the performance-mode block write operation, the reference count within the matched hash table entry 365 is incremented (rc++) and the hash table block containing entry 365 written back to the prefix-indexed location within the hash lookup table 370 as shown at (6*a*) to reflect the increased number of references to the solitary instance of the write data block within block storage table 330.

Returning to the performance-mode search operation at (4), if no suffix-matching entry is found within the indexed hash table block, the file system manager infers that no instance of the incoming write data block exists within block storage table 330 (i.e., by virtue of the one-to-one relationship assumed between hash values and data blocks within block storage table 330), and therefore stores the incoming write data block at an unoccupied physical block address (PBA) within block storage table 330 and allocates a vacant entry within the indexed hash table block 372 for storage of the PBA and hash suffix, setting the reference count to one to validate the entry within the hash lookup table. The file system manager also inserts a new pointer entry 367 within the file "X" iNode 360 at the location indexed by the incoming LBA, populating the pointer entry with the hash prefix and PBA.

Comparing the storage requirements and I/O operation count of the benchmark and performance modes, bifurcated (split) storage of the hash prefix and suffix (the former within iNode 360, the latter within hash lookup table 370) in performance mode requires a net storage of only one hash value per write data block, thus cutting the hash value storage overhead in half relative to the benchmark mode. As the hash value is, in many applications, the single largest value stored within the deduplication data structures (e.g., a 128-bit or 256-bit hash value, in contrast to a 36-bit physical block address that may be applied in a storage system capable of storing 48 billion 4 KB data blocks (256 TB)), halving the hash storage overhead in this way dramatically reduces the total storage overhead of the deduplication function. Further, in contrast to the log N I/O operations required to search the hash tree in benchmark mode, only one I/O operation is needed to obtain the relevant hash lookup table block, regardless of whether the incoming write data block is already present within block storage table 330. Note that, because hash lookup table 370 (like search tree 320 in benchmark mode) may in many cases be stored within a non-volatile storage accessed on a block by block basis, at least one insight yielding the reduced I/O count in the performance mode operation is that, at minimum, a full block of storage will be returned in any read access, so that any access to a deduplication data structure for hash-matching purposes may as well bring as many relevant entries (e.g., all entries sharing the same hash prefix) as possible. In any event, the preservation of I/O operations for client-requested transactions lowers run-time overhead of the deduplication function and boosts the overall performance of the host system.

Figure 9:
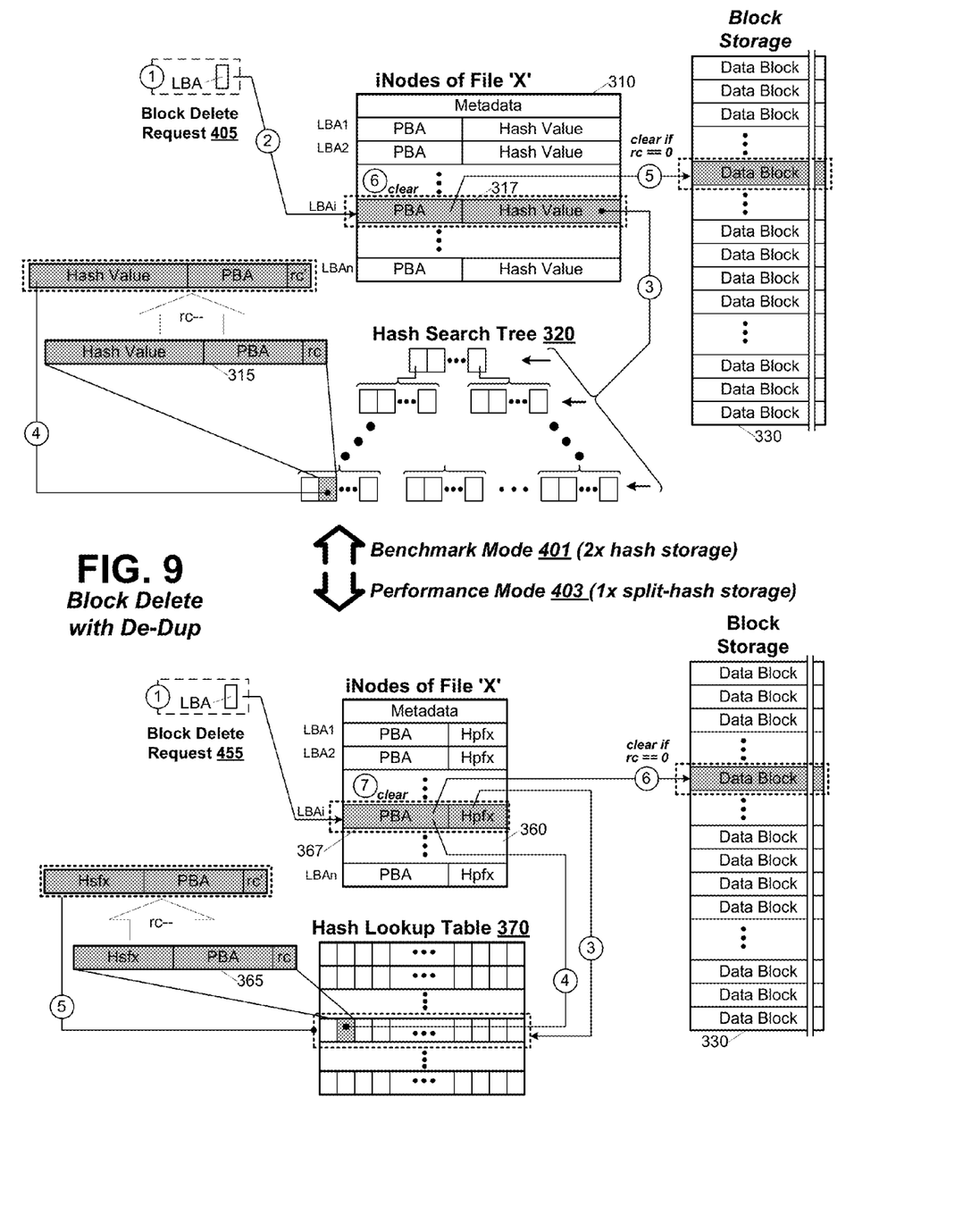
FIG. 9 contrasts block delete operations in benchmark and performance operating modes within a deduplicating, multi-mode file system manager.

FIG. 9 contrasts block delete operations in benchmark and performance operating modes within a deduplicating, multi-mode file system manager. Referring first to benchmark mode 401, the file system manager receives a block delete (or removal) request 405 in connection with file "X" at (1) accompanied by a logical block address (LBA). The LBA is applied to index the iNode 310 of file "X" at (2), thus retrieving the pointer entry 317 inserted in the benchmark-mode block write operation described above. The hash value within pointer entry 317 is then applied in a hash tree search at (3) to locate an entry 315 within search tree 320 containing a matching hash value. As discussed above, the tree search operation generally involves log N I/O operations, as the file system manager traverses the levels of the tree to reach the leaf node containing the matching hash value. At (4), the reference count within search tree entry 315 is decremented (rc−−) and the entry is written back to search tree 320, thereby marking the removal of one instance of the deduplicated data block. If the reference count is zero (a consequence that may be used to signify invalidation of the search tree entry when that entry is written back to the search tree in (4)), then no further references to the data block remain, so that, as shown at (5), the data block is deleted, cleared or otherwise invalidated within block storage table 330. Finally, the iNode entry indexed by the incoming LBA is cleared at (6) to reflect deletion of the data block reference.

Turning now to a corresponding block delete operation within the performance-mode file system manager configuration, an incoming LBA is received in conjunction with a block delete request 455 in (1), and the LBA is used to index iNode 360 of the subject file to retrieve the pointer entry 367 inserted during the performance-mode block write operation described above. At this point, however, instead of a multi-I/O hash tree search operation, the hash prefix within the LBA-indexed pointer entry 367 is simply applied to index hash lookup table 370 as shown at (3), thus requiring only a single I/O operation to retrieve the hash table block containing the hash suffix. As alluded to above, though the hash suffix is unavailable to find the entry of interest within the indexed hash table block, the physical block address and net hash value (prefix plus suffix) have a one-to-one correspondence. With this insight, it follows that the physical block address within LBA-indexed pointer entry 367 can be used instead of the unavailable (unknown at this point) hash suffix to identify the entry of interest within the indexed hash table block. Thus, at (4), the PBA within iNode pointer entry 367 is compared with PBAs of valid entries of the indexed hash table block (e.g., those entries with nonzero reference counts) to find an entry containing a matching PBA, thus locating the lookup table entry 365 for the data block to be deleted. Continuing with the performance-mode block delete operation, the reference count within the PBA-matched lookup table entry 365 is decremented (rc−) and the entry written back to the hash lookup table at (5) in a block write operation (i.e., the entire hash table block is rewritten in an embodiment that imposes block-level write granularity). If the reference count is decremented to zero (a consequence that serves to invalidate the lookup table entry when during the hash table write operation at (5)), then no further references remain to the data block within block storage table 330 so that, as shown at (6), the data block is cleared, deleted or otherwise removed from block storage table 330. Thereafter, at (7), the iNode entry 367 is cleared to reflect the removal/deletion of the data block reference.

Again, comparing the I/O operation count between the benchmark and performance mode delete operations, only a single I/O operation (i.e., to acquire the hash table block at (3)) is required to support deduplicated block storage, while log N I/O operations are required to search the hash tree in benchmark mode. Accordingly, as in the block write operation described above, I/O operations are preserved for client-requested transactions instead of accruing to deduplication overhead, thus enhancing the overall performance of the host system.

The various deduplication data structures, methods and techniques disclosed herein may be implemented through execution of one or more sequences of instructions (i.e., software program(s)) within a computer system, or by a custom-built hardware ASIC (application-specific integrated circuit), or programmed on a programmable hardware device such as an FPGA (field-programmable gate array), or any combination thereof within or external to the computer system.

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within one or more processors of a special purpose or general purpose computer system or consumer electronic device or appliance, such as the system, device or appliance described in reference to FIG. 7. Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of various disclosed embodiments. In some instances, the terminology and symbols may imply specific details that are not required to implement particular embodiments. For example, any of the specific numbers of bits, bytes, storage capacities and the like may be different from those described above in alternative embodiments. The term "coupled" is used herein to express a direct connection as well as a connection through one or more intervening circuits or structures. Device (or system) "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of operation within a deduplicating data storage system, the method comprising:
   generating a write-data hash value that corresponds to a block of write data;
   retrieving, from a lookup table stored within a block-based storage medium, a block of lookup table entries from a location within the lookup table indicated by a first portion of the write-data hash value, each lookup table entry including a pointer to a respective stored data volume, a portion of a hash value that corresponds to the stored data volume, and a reference count indicating a quantity of references to the stored data volume;
   comparing a second portion of the write-data hash value to the portions of the hash values within the block of lookup table entries; and
   incrementing the reference count within a first one of the lookup table entries for which the portion of the hash value therein is determined to match the second portion of the write-data hash value.

2. The method of claim 1 wherein generating the write-data hash value that corresponds to the block of write data comprises generating a crypto-strength hash value.

3. The method of claim 1 wherein retrieving the block of lookup table entries from the location within the lookup table location indicated by the first portion of the write-data hash value comprises addressing the lookup table using a predetermined set of N constituent bits of the write-data hash value, the write-data hash value having a total of M constituent bits, M being greater than N.

4. The method of claim 3 wherein comparing a second portion of the write-data hash value to the portions of the hash values within the block of lookup table entries comprises comparing a predetermined set of M minus N constituent bits of the write-data hash value to like-sized portions of hash values within the block of lookup table entries, the M minus N constituent bits excluding the predetermined set of N constituent bits of the write-data hash value.

5. The method of claim 1 wherein retrieving the block of lookup table entries from the location within the lookup table indicated by the first portion of the write-data hash value comprises retrieving a fixed-size block of data from the lookup table, the block of data having a size constraint imposed by the block-based storage medium.

6. The method of claim 1 wherein the block of write data comprises a logical write data block within a block-level file system, and wherein each of the stored data volumes pointed to by respective pointers within block of lookup table entries comprises a physical data block having a different size than the logical write data block.

7. The method of claim 1 further comprising storing the first portion of the write-data hash value within a data structure location indicated by a logical address provided in connection with the block of write data.

8. The method of claim 7 further comprising storing, within the data structure location indicated by the logical address, a copy of the pointer to the respective stored data volume obtained from the first one of the lookup table entries.

9. The method of claim 7 wherein the data structure comprises an iNode data structure within a file system manager of the data storage system.

10. The method of claim 1 wherein the data storage system comprises a nonvolatile storage system, and wherein the block-based storage medium comprises nonvolatile memory within the nonvolatile storage system.

11. A deduplicating data storage system comprising:
hash generator logic to generate a write-data hash value that corresponds to a block of write data;
a block-based storage medium to store a lookup table;
lookup-table indexing logic to retrieve a block of lookup table entries from a location within the lookup table indicated by a first portion of the write-data hash value, each lookup table entry including a pointer to a respective stored data volume, a portion of a hash value that corresponds to the stored data volume, and a reference count indicating a quantity of references to the stored data volume;
comparator logic to compare a second portion of the write-data hash value to the portions of the hash values within the block of lookup table entries; and
update logic to increment the reference count within a first one of the lookup table entries for which the portion of the hash value therein is determined to match the second portion of the write-data hash value.

12. The deduplicating data storage system of claim 11 wherein the hash generator logic to generate the write-data hash value that corresponds to the block of write data comprises logic to generate a crypto-strength hash value.

13. The deduplicating data storage system of claim 11 wherein the lookup-table indexing logic to retrieve the block of lookup table entries from the location within the lookup table indicated by the first portion of the write-data hash value comprises logic to address the lookup table using a predetermined set of N constituent bits of the write-data hash value, the write-data hash value having a total of M constituent bits, M being greater than N.

14. The deduplicating data storage system of claim 13 wherein the comparator logic to compare a second portion of the write-data hash value to the portions of the hash values within the block of lookup table entries comprises logic to compare a predetermined set of M minus N constituent bits of the write-data hash value to like-sized portions of hash values within the block of lookup table entries, the M minus N constituent bits excluding the predetermined set of N constituent bits of the write-data hash value.

15. The deduplicating data storage system of claim 11 wherein the lookup-table indexing logic to retrieve the block of lookup table entries from the location within the lookup table indicated by the first portion of the write-data hash value comprises logic to retrieve a fixed-size block of data from the lookup table, the fixed-size block of data having a size constraint imposed by the block-based storage medium.

16. The deduplicating data storage system of claim 11 wherein the block of write data comprises a logical write data block within a block-level file system, and wherein each of the stored data volumes pointed to by respective pointers within block of lookup table entries comprises a physical data block having a different size than the logical write data block.

17. The deduplicating data storage system of claim 11 wherein the update logic comprises logic to store the first portion of the write-data hash value within a data structure location indicated by a logical address provided in connection with the block of write data.

18. The deduplicating data storage system of claim 17 wherein the update logic further comprises logic to store, within the data structure location indicated by the logical address, a copy of the pointer to the respective stored data volume obtained from the first one of the lookup table entries.

19. The deduplicating data storage system of claim 17 wherein the data structure comprises an iNode data structure within a file system manager of the data storage system.

20. The deduplicating data storage system of claim 11 wherein at least one of the hash generator logic, lookup table indexing logic, comparator logic and update logic is implemented at least in part by a programmed processor.

21. A non-transitory computer-readable medium having one or more sequences of instructions embodied therein which, when executed by one or more processors, cause the one or more processors to:
generate a write-data hash value that corresponds to block of write data;
retrieve, from a lookup table stored within a block-based storage medium, a block of lookup table entries from a location within the lookup table indicated by a first portion of the write-data hash value, each lookup table entry including a pointer to a respective stored data volume, a portion of a hash value that corresponds to the stored data volume, and a reference count indicating a quantity of references to the stored data volume;
compare a second portion of the write-data hash value to the portions of the hash values within the block of lookup table entries; and
increment the reference count within a first one of the lookup table entries for which the portion of the hash value therein is determined to match the second portion of the write-data hash value.

* * * * *